(12) United States Patent
Bone

(10) Patent No.: US 10,215,958 B2
(45) Date of Patent: Feb. 26, 2019

(54) OPTICAL IMAGING LENS

(71) Applicant: Genius Electronic Optical Co., Ltd., Taichung (TW)

(72) Inventor: Matthew Bone, Fujian (CN)

(73) Assignee: Genius Electronic Optical Co., Ltd., Taichung (TW)

( * ) Notice: Subject to any disclaimer, the term of this patent is extended or adjusted under 35 U.S.C. 154(b) by 9 days.

(21) Appl. No.: 15/491,987

(22) Filed: Apr. 20, 2017

(65) Prior Publication Data

US 2018/0307007 A1 Oct. 25, 2018

(51) Int. Cl.
*G02B 9/12* (2006.01)
*G02B 13/00* (2006.01)
*G02B 27/00* (2006.01)
*G02B 9/16* (2006.01)
*G02B 13/02* (2006.01)

(52) U.S. Cl.
CPC ............ *G02B 13/0015* (2013.01); *G02B 9/16* (2013.01); *G02B 13/02* (2013.01); *G02B 27/0025* (2013.01)

(58) Field of Classification Search
CPC ............. G02B 9/12; G02B 9/34; G02B 13/04
USPC .......................... 359/715, 716, 753, 771, 784
See application file for complete search history.

(56) References Cited

U.S. PATENT DOCUMENTS 3,191,488 A * 6/1965 Eisner ....................... G01J 3/14
356/300

* cited by examiner

*Primary Examiner* — William Choi
(74) *Attorney, Agent, or Firm* — JCIPRNET

(57) ABSTRACT

An optical imaging lens is configured to allow imaging rays to pass through a first curved surface of an optical element and the optical imaging lens in sequence. The optical imaging lens includes first, second and last lens element arranged in a sequence. One of the object-side surface and the image-side surface of the last lens element is a second curved surface. A cross-sectional line of the second curved surface of the last lens element obtained by cutting the second curved surface of the last lens element along a plane parallel to the XZ plane is a second curved line. A material of at least one of the first lens element to the last lens element is a plastic material.

18 Claims, 13 Drawing Sheets

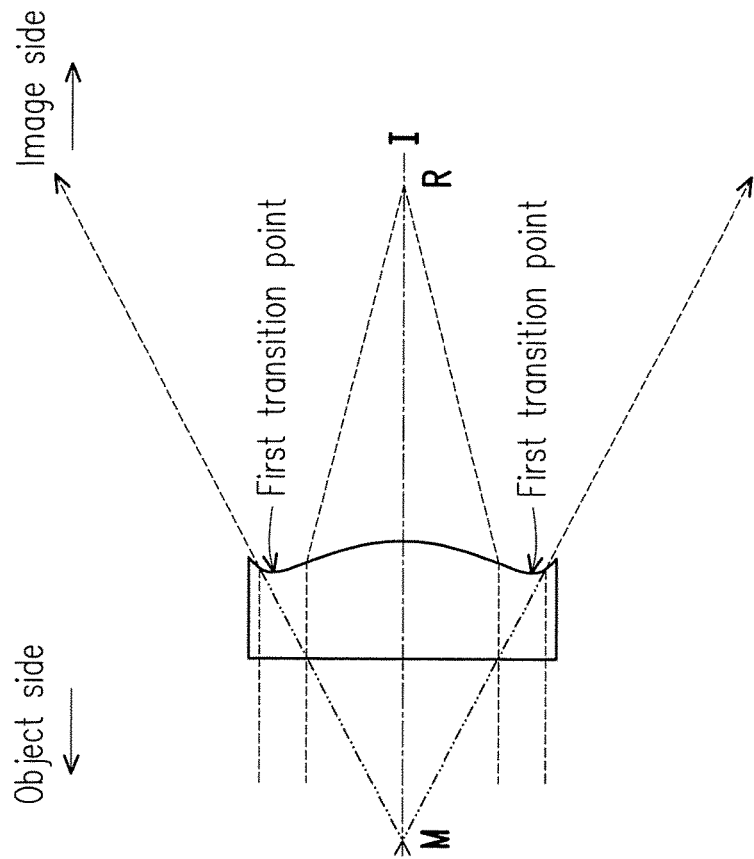
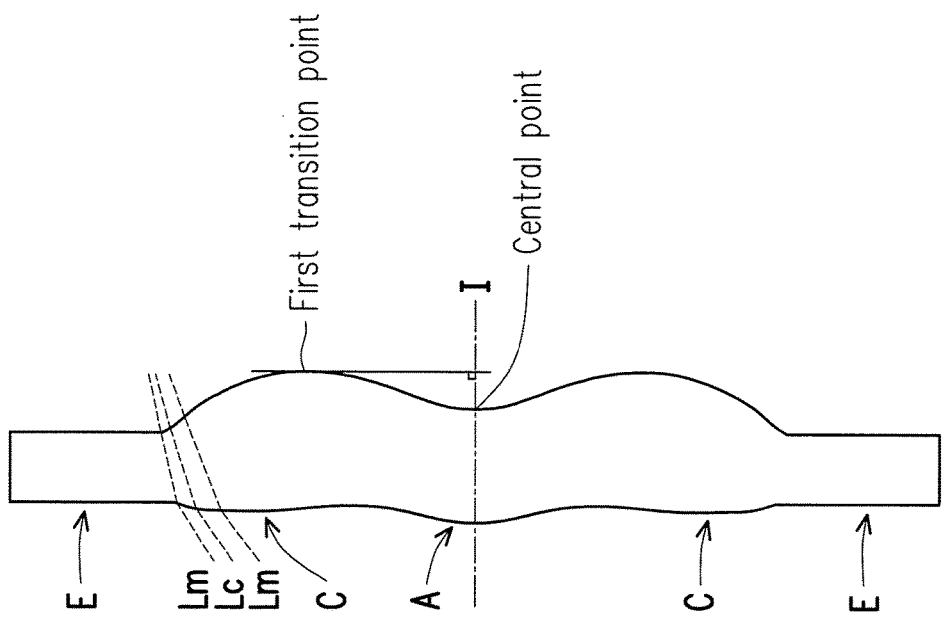
FIG. 1
FIG. 2

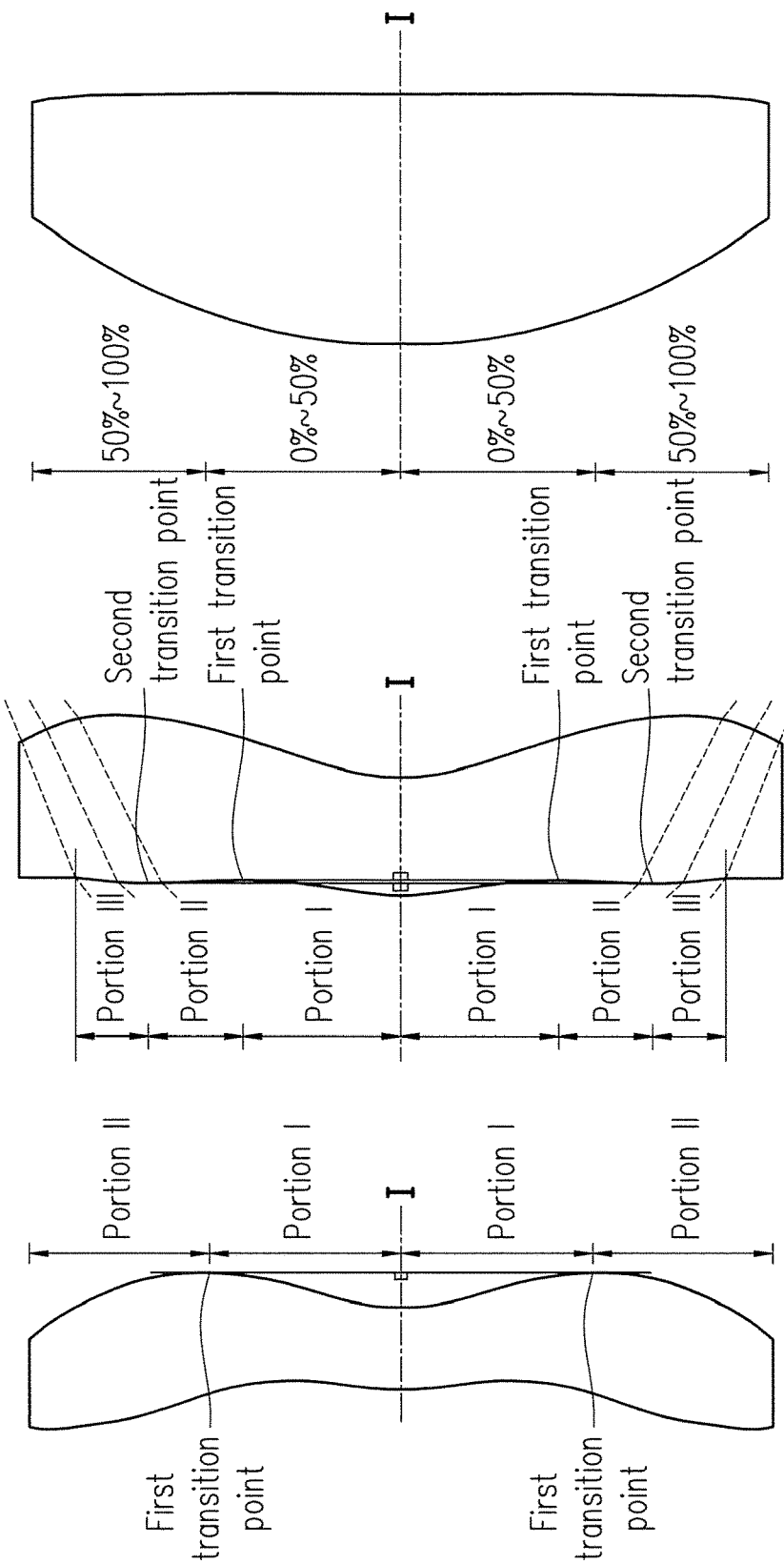

| First embodiment |||||||
|---|---|---|---|---|---|---|
| Effective focal length=69.444 mm , Half field of view=20.000°, F-number=2.84 |||||||
| Element | Surface | Radius of curvature(mm) | Thickness (mm) | Refractive index | Abbe number | Focal length(mm) |
| Optical element 4 | Object-side surface 41 (Biconic surface) | YZ: Infinity XZ:50.762 | 2.286 | 1.585 | 29.909 | -2966.465 |
| | Image-side surface 42 (Biconic surface) | YZ: Infinity XZ:48.476 | 5.357 | | | |
| Aperture stop 0 | | Infinity | -3.346 | | | |
| First lens element 1 | Object-side surface 11 (Spherical surface) | 26.933 | 6.019 | 1.847 | 23.791 | 47.820 |
| | Image-side surface 12 (Spherical surface) | 77.891 | 1.400 | | | |
| Second lens element 2 | Object-side surface 21 (Aspheric surface) | 84.680 | 2.000 | 1.536 | 55.794 | -41.901 |
| | Image-side surface 22 (Aspheric surface) | 17.378 | 4.847 | | | |
| Last lens element 3 | Object-side surface 31 (Toroidal surface) | YZ: Infinity XZ: 946.556 | 6.339 | 1.642 | 22.496 | 61.612 |
| | Image-side surface 32 (Aspheric surface) | -38.212 | 56.360 | | | |
| | Image surface 100 (Aspheric surface) | -2.071 | 0.000 | | | |

FIG.8

| Surface | K | a2 | a4 | a6 | a8 |
|---|---|---|---|---|---|
| 21 | 0.000000E+00 | 0.000000E+00 | -8.043500E-05 | 3.518000E-07 | -7.131000E-10 |
| 22 | 0.000000E+00 | 0.000000E+00 | -9.113900E-05 | 3.600000E-07 | -1.000000E-09 |
| 31 | 0.000000E+00 | 0.000000E+00 | 1.249000E-06 | -1.142000E-08 | 2.737000E-11 |
| 32 | 0.000000E+00 | 0.000000E+00 | -6.568000E-06 | 3.732000E-08 | -2.085000E-10 |
| 100 | -1.000000E+00 | 2.370000E-01 | 0.000000E+00 | 0.000000E+00 | 0.000000E+00 |
| Surface | a10 | | | | |
| 21 | 0.000000E+00 | | | | |
| 22 | 0.000000E+00 | | | | |
| 31 | 0.000000E+00 | | | | |
| 32 | 2.842000E-13 | | | | |
| 100 | 0.000000E+00 | | | | |

FIG. 9

| Second embodiment |||||||
|---|---|---|---|---|---|---|
| Effective focal length=69.427 mm , Half field of view=20.000°, F-number=2.84 |||||||
| Element | Surface | Radius of curvature(mm) | Thickness (mm) | Refractive index | Abbe number | Focal length(mm) |
| Optical element 4 | Object-side surface 41 (Biconic surface) | YZ: Infinity XZ: 50.762 | 2.286 | 1.585 | 29.909 | -2966.465 |
| | Image-side surface 42 (Biconic surface) | YZ: Infinity XZ: 48.476 | 5.357 | | | |
| Aperture stop 0 | | Infinity | -3.251 | | | |
| First lens element 1 | Object-side surface 11 (Spherical surface) | 27.622 | 5.338 | 1.847 | 23.791 | 56.404 |
| | Image-side surface 12 (Spherical surface) | 62.906 | 1.400 | | | |
| Second lens element 2 | Object-side surface 21 (Aspheric surface) | 47.009 | 3.000 | 1.536 | 55.794 | -50.866 |
| | Image-side surface 22 (Aspheric surface) | 16.700 | 4.806 | | | |
| Last lens element 3 | Object-side surface 31 (Toroidal surface) | YZ: Infinity XZ:997.845 | 6.057 | 1.642 | 22.496 | 60.821 |
| | Image-side surface 32 (Aspheric surface) | -39.112 | 56.360 | | | |
| | Image surface 100 (Aspheric surface) | -2.071 | 0.000 | | | |

FIG. 13

| Surface | K | a2 | a4 | a6 | a8 |
|---|---|---|---|---|---|
| 21 | 0.000000E+00 | 0.000000E+00 | -7.326100E-05 | 2.013000E-07 | -2.892000E-10 |
| 22 | 0.000000E+00 | 0.000000E+00 | -9.096300E-05 | 2.209000E-07 | -7.613000E-10 |
| 31 | 0.000000E+00 | 0.000000E+00 | 0.000000E+00 | 0.000000E+00 | 0.000000E+00 |
| 32 | 0.000000E+00 | 0.000000E+00 | -5.982000E-06 | 3.488000E-08 | -1.984000E-10 |
| 100 | -1.000000E+00 | 2.370000E-01 | 0.000000E+00 | 0.000000E+00 | 0.000000E+00 |

| Surface | a10 |
|---|---|
| 21 | 0.000000E+00 |
| 22 | 0.000000E+00 |
| 31 | 0.000000E+00 |
| 32 | 5.969000E-13 |
| 100 | 0.000000E+00 |

FIG. 14

| Optical parameters | First embodiment | Second embodiment |
|---|---|---|
| T1 | 6.019 | 5.338 |
| G12 | 1.400 | 1.400 |
| T2 | 2.000 | 3.000 |
| G23 | 4.847 | 4.806 |
| T3 | 6.339 | 6.057 |
| BFL | 56.360 | 56.360 |
| EFL | 69.444 | 69.427 |
| TTL | 76.965 | 76.961 |
| ALT | 14.358 | 14.396 |
| AAG | 6.247 | 6.206 |
| TTL/BFL | 1.366 | 1.366 |
| ALT/AAG | 2.299 | 2.320 |
| EFL/TTL | 0.902 | 0.902 |
| T3/T1 | 1.053 | 1.135 |
| BFL/T3 | 8.891 | 9.304 |
| BFL/T1 | 9.363 | 10.558 |
| T1/T2 | 3.010 | 1.779 |

FIG. 16

OPTICAL IMAGING LENS

BACKGROUND OF THE INVENTION

1. Field of the Invention

The present invention relates to an optical lens, and particularly relates to an optical imaging lens.

In recent years, along with wide use of electronic products such as an airborne radar, a car radar, a panoramic photography apparatus, etc, techniques related to image module are quickly developed, and the image module mainly includes components such as an optical imaging lens, a module holder unit, a sensor, etc., and a thinning and lightweight trend of the electronic products increases a miniaturization demand of the image module. Along with technology improvement and size reduction of charge coupled devices (CCD) and complementary metal oxide semiconductors (CMOS), a length of the optical imaging lens installed in the image module is also required to be correspondingly shortened. Moreover, in order to obtain a wider environment image by the optical imaging lens, an optical element having a curved surface is disposed ahead of the optical imaging lens. However, astigmatism of an image on the image surface is caused by the curved surface of the optical element.

SUMMARY OF THE INVENTION

The invention is directed to an optical imaging lens, which correct astigmatism caused by a curved surface of an optical element.

An embodiment of the present invention provides an optical imaging lens configured to allow imaging rays to pass through a first curved surface of an optical element and the optical imaging lens in sequence to form an image on an image surface. The optical imaging lens includes a first lens element, a second lens element, and a last lens element arranged in sequence from an object side to an image side along an optical axis. The last lens element is a lens element in the optical imaging lens nearest to the image side. Each of the first lens element to the last lens element has an object-side surface facing the object side and pervious to the imaging rays and an image-side surface facing the image side and pervious to the imaging rays. A Z direction is parallel to the optical axis. A Y direction is perpendicular to the Z direction. An X direction is perpendicular to the Y direction and the Z direction. A XZ plane is defined by the X direction and the Z direction. An YZ plane is defined by the Y direction and the Z direction. A cross-sectional line of the first curved surface of the optical element obtained by cutting the first curved surface of the optical element along a plane parallel to the XZ plane and containing the optical axis is a first curved line. One of the object-side surface and the image-side surface of the last lens element is a second curved surface. A cross-sectional line of the second curved surface of the last lens element obtained by cutting the second curved surface of the last lens element along a plane parallel to the XZ plane and containing the optical axis is a second curved line. A cross-sectional line of the second curved surface of the last lens element obtained by cutting the second curved surface of the last lens element along a plane parallel to the YZ plane and containing the optical axis is substantially a straight line. A material of at least one of the first lens element to the last lens element is a plastic material.

According to the above descriptions, an advantageous effect of the optical imaging lens according to the embodiment of the invention is as follows. The optical imaging lens utilizes the second curved surface of the last lens element designed as mentioned above to be able to correct astigmatism caused by the first curved surface of the optical element.

In order to make the aforementioned and other objectives and advantages of the present invention comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1 is a schematic diagram illustrating a surface shape structure of a lens.

FIG. 2 is a schematic diagram illustrating surface shape concave and convex structures and a light focal point.

FIG. 3 is a schematic diagram illustrating a surface shape structure of a lens of a first example.

FIG. 4 is a schematic diagram illustrating a surface shape structure of a lens of a second example.

FIG. 5 is a schematic diagram illustrating a surface shape structure of a lens of a third example.

FIG. 8 shows detailed optical data of an optical imaging lens according to a first embodiment of the present invention.

FIG. 9 shows aspheric parameters of an optical imaging lens according to a first embodiment of the present invention.

FIG. 13 shows detailed optical data of an optical imaging lens according to a second embodiment of the present invention.

FIG. 14 shows aspheric parameters of an optical imaging lens according to a second embodiment of the present invention.

FIG. 16 shows values of relational expressions of important parameters of an optical imaging lens according to first to second embodiments of the present invention.

DESCRIPTION OF THE EMBODIMENTS

Figure 6A:
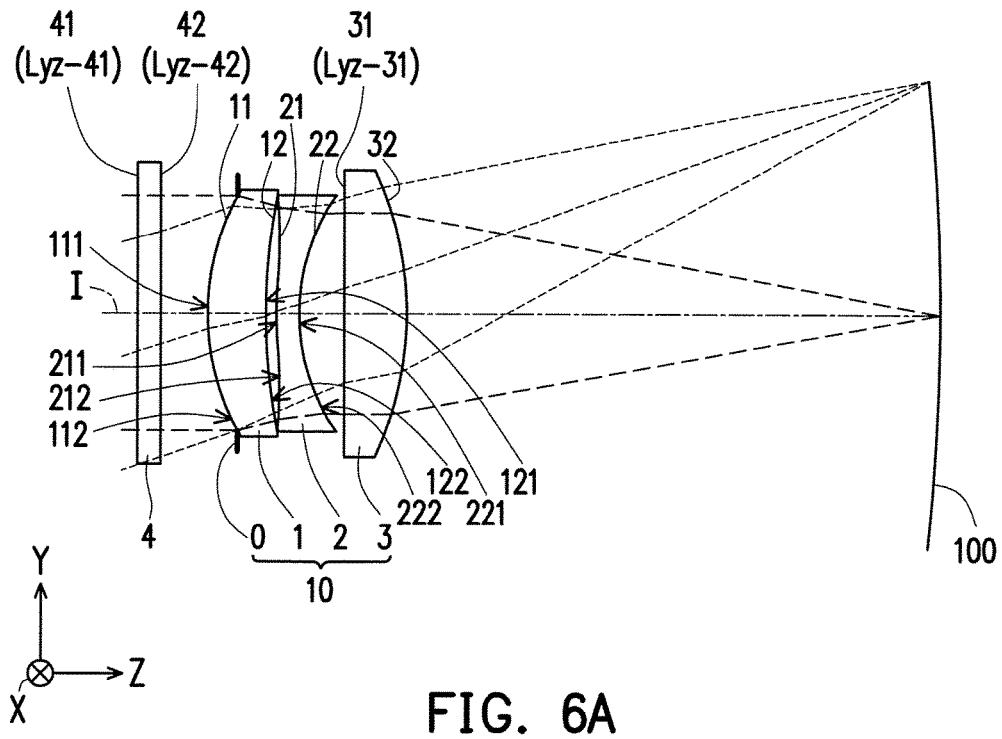
FIG. 6A is a schematic diagram illustrating cross sections of an optical element, an optical imaging lens and an image surface obtained by cutting the optical element, the optical imaging lens and the image surface along a plane parallel to an YZ plane and containing the optical axis I according to a first embodiment of the present invention.

In the present specification, the description "a lens element having positive refracting power (or negative refracting power)" means that the paraxial refracting power of the lens element in Gaussian optics is positive (or negative). The description "An object-side (or image-side) surface of a lens element" only includes a specific region of that surface of the lens element where imaging rays are capable of passing through that region, namely the clear aperture of the surface. The aforementioned imaging rays can be classified into two types, chief ray Lc and marginal ray Lm. Taking a lens element depicted in FIG. 1 as an example, the lens element is rotationally symmetric, where the optical axis I is the axis of symmetry. The region A of the lens element is defined as "a portion in a vicinity of the optical axis", and the region C of the lens element is defined as "a portion in a vicinity of a periphery of the lens element". Besides, the lens element may also have an extending portion E extended radially and outwardly from the region C, namely the portion outside of the clear aperture of the lens element. The extending portion E is usually used for physically assembling the lens element into an optical imaging lens system. Under normal circumstances, the imaging rays would not pass through the extending portion E because those imaging rays only pass through the clear aperture. The structures and shapes of the aforementioned extending portion E are only examples for technical explanation, the structures and shapes of lens elements should not be limited to these examples. Note that the extending portions of the lens element surfaces depicted in the following embodiments are partially omitted.

The following criteria are provided for determining the shapes and the portions of lens element surfaces set forth in the present specification. These criteria mainly determine the boundaries of portions under various circumstances including the portion in a vicinity of the optical axis, the portion in a vicinity of a periphery of a lens element surface, and other types of lens element surfaces such as those having multiple portions.

1. FIG. 1 is a radial cross-sectional view of a lens element. Before determining boundaries of those aforesaid portions, two referential points should be defined first, central point and transition point. The central point of a surface of a lens element is defined as a point of intersection of that surface and the optical axis. The transition point is defined as a point on a surface of a lens element, where the tangent line of that point is perpendicular to the optical axis. Additionally, if multiple transition points appear on one single surface, then these transition points are sequentially named along the radial direction of the surface with numbers starting from the first transition point. For instance, the first transition point (closest one to the optical axis), the second transition point, and the Nth transition point (farthest one to the optical axis within the scope of the clear aperture of the surface). The portion of a surface of the lens element between the central point and the first transition point is defined as the portion in a vicinity of the optical axis. The portion located radially outside of the Nth transition point (but still within the scope of the clear aperture) is defined as the portion in a vicinity of a periphery of the lens element. In some embodiments, there are other portions existing between the portion in a vicinity of the optical axis and the portion in a vicinity of a periphery of the lens element; the numbers of portions depend on the numbers of the transition point(s). In addition, the radius of the clear aperture (or a so-called effective radius) of a surface is defined as the radial distance from the optical axis I to a point of intersection of the marginal ray Lm and the surface of the lens element.

2. Referring to FIG. 2, determining the shape of a portion is convex or concave depends on whether a collimated ray passing through that portion converges or diverges. That is, while applying a collimated ray to a portion to be determined in terms of shape, the collimated ray passing through that portion will be bended and the ray itself or its extension line will eventually meet the optical axis. The shape of that portion can be determined by whether the ray or its extension line meets (intersects) the optical axis (focal point) at the object-side or image-side. For instance, if the ray itself intersects the optical axis at the image side of the lens element after passing through a portion, i.e. the focal point of this ray is at the image side (see point R in FIG. 2), the portion will be determined as having a convex shape. On the contrary, if the ray diverges after passing through a portion, the extension line of the ray intersects the optical axis at the object side of the lens element, i.e. the focal point of the ray is at the object side (see point M in FIG. 2), that portion will be determined as having a concave shape. Therefore, referring to FIG. 2, the portion between the central point and the first transition point has a convex shape, the portion located radially outside of the first transition point has a concave shape, and the first transition point is the point where the portion having a convex shape changes to the portion having a concave shape, namely the border of two adjacent portions. Alternatively, there is another common way for a person with ordinary skill in the art to tell whether a portion in a vicinity of the optical axis has a convex or concave shape by referring to the sign of an "R" value, which is the (paraxial) radius of curvature of a lens surface. The R value which is commonly used in conventional optical design software such as Zemax and CodeV. The R value usually appears in the lens data sheet in the software. For an object-side surface, positive R means that the object-side surface is convex, and negative R means that the object-side surface is concave. Conversely, for an image-side surface, positive R means that the image-side surface is concave, and negative R means that the image-side surface is convex. The result found by using this method should be consistent as by using the other way mentioned above, which determines surface shapes by referring to whether the focal point of a collimated ray is at the object side or the image side.

3. For none transition point cases, the portion in a vicinity of the optical axis is defined as the portion between 0~50% of the effective radius (radius of the clear aperture) of the surface, whereas the portion in a vicinity of a periphery of the lens element is defined as the portion between 50~100% of the effective radius (radius of the clear aperture) of the surface.

Referring to the first example depicted in FIG. 3, only one transition point, namely a first transition point, appears within the clear aperture of the image-side surface of the lens element. Portion I is a portion in a vicinity of the optical axis, and portion II is a portion in a vicinity of a periphery of the lens element. The portion in a vicinity of the optical axis is determined as having a concave surface due to that the R value at the image-side surface of the lens element is positive. The shape of the portion in a vicinity of a periphery of the lens element is different from that of the radially inner adjacent portion, i.e. the shape of the portion in a vicinity of a periphery of the lens element is different from the shape of the portion in a vicinity of the optical axis; the portion in a vicinity of a periphery of the lens element has a convex shape.

Referring to the second example depicted in FIG. 4, a first transition point and a second transition point exist on the object-side surface (within the clear aperture) of a lens element. In which portion I is the portion in a vicinity of the optical axis, and portion III is the portion in a vicinity of a periphery of the lens element. The portion in a vicinity of the optical axis has a convex shape because that the R value at the object-side surface of the lens element is positive. The portion in a vicinity of a periphery of the lens element (portion III) has a convex shape. What is more, there is another portion having a concave shape existing between the first and second transition points (portion II).

Referring to a third example depicted in FIG. 5, no transition point exists on the object-side surface of the lens element. In this case, the portion between 0~50% of the effective radius (radius of the clear aperture) is determined as the portion in a vicinity of the optical axis, and the portion between 50~100% of the effective radius is determined as the portion in a vicinity of a periphery of the lens element. The portion in a vicinity of the optical axis of the object-side surface of the lens element is determined as having a convex shape due to its positive R value, and the portion in a vicinity of a periphery of the lens element is determined as having a convex shape as well.

Figure 6B:
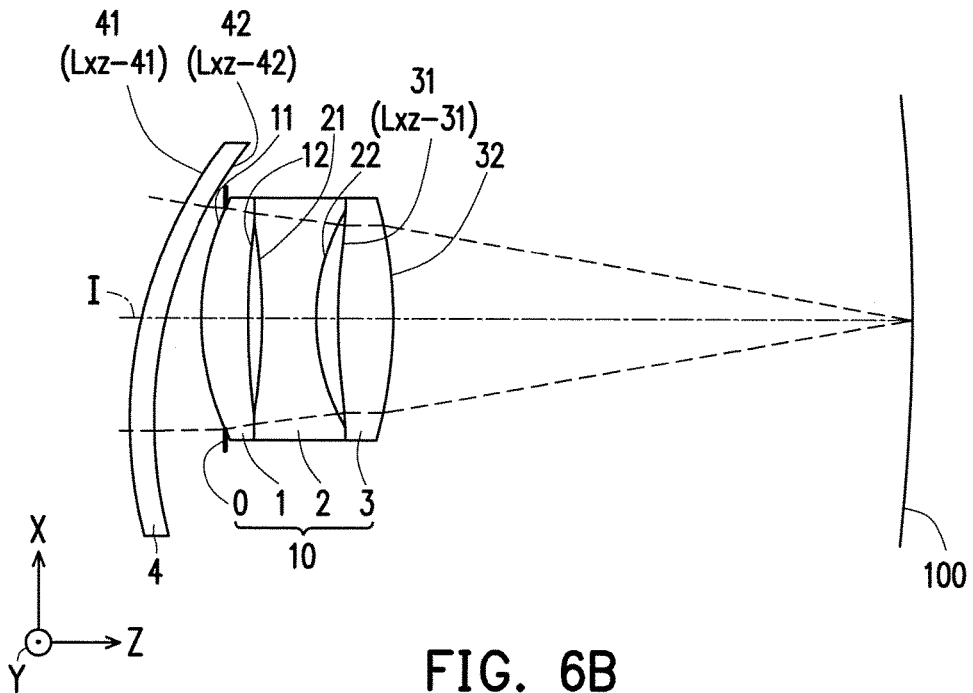
FIG. 6B is a schematic diagram illustrating cross sections of an optical element, an optical imaging lens and an image surface obtained by cutting the optical element, the optical imaging lens and the image surface along a plane parallel to an XZ plane and containing the optical axis according to a first embodiment of the present invention.

FIG. 6A is a schematic diagram illustrating cross sections of an optical element 4, an optical imaging lens 10 and an image surface 100 obtained by cutting the optical element 4, the optical imaging lens 10 and the image surface 100 along a plane parallel to an YZ plane and containing the optical axis I according to a first embodiment of the present invention. FIG. 6B is a schematic diagram illustrating cross sections of an optical element 4, an optical imaging lens 10 and an image surface 100 obtained by cutting the optical element 4, the optical imaging lens 10 and the image surface 100 along a plane parallel to an XZ plane and containing the optical axis I according to a first embodiment of the present invention.

Referring to FIG. 6A and FIG. 6B, the optical imaging lens 10 is configured to allow imaging rays to pass through at least one first curved surface of the optical element 4 and the optical imaging lens 10 in sequence to form an image on an image surface 100. More imaging rays emitted by an object can be collected to the optical imaging lens 10 by an effect of the at least one first curved surface of the optical element 4, so as to obtain a wider image on the image surface 100. In the present embodiment, the at least one first curved surface of the optical element 4 includes at least one of a convex surface protruding toward an object side and a concave surface recessed toward the object side. For example, the optical element 4 has an object-side surface 41 facing the object side and pervious to the imaging rays and an image-side surface 42 facing the image side and pervious to the imaging rays, and the at least one first curved surface of the optical element 4 may include the object-side surface 41 protruding toward the object side and the image-side surface 42 recessed toward the object side, but the invention is not limited thereto. In other embodiments, the at least one first curved surface of the optical element 4 may only include the object-side surface 41 protruding toward the object side or the image-side surface 42 recessed toward the object side, and one of the object-side surface 41 and the image-side surface 42 may not be a curved surface. Moreover, in other embodiments, the at least one first curved surface of the optical element 4 may be a freeform surface.

In the present embodiment, the object-side surface 41 is a biconic surface. In other word, a Z direction is parallel to the optical axis I, a Y direction is perpendicular to the Z direction, an X direction is perpendicular to the Y direction and the Z direction, an YZ plane is defined by the Y direction and the Z direction, an XZ plane is defined by the X direction and the Z direction, a cross-sectional line Lyz-41 of the object-side surface 41 obtained by cutting the object-side surface 41 along a plane parallel to the YZ plane and containing the optical axis I is a straight line, and a cross-sectional line Lxz-41 of the object-side surface 41 obtained by cutting the object-side surface 41 along a plane parallel to the XZ plane and containing the optical axis I is a curved line (referred to as a first curved line). The image-side surface 42 is also a biconic surface. In other word, a cross-sectional line Lyz-42 of the image-side surface 42 obtained by cutting the image surface 42 along a plane parallel to the YZ plane and containing the optical axis I is a straight line, and a cross-sectional line Lxz-42 of the image-side surface 42 obtained by cutting the image-side surface 42 along a plane parallel to the XZ plane and containing the optical axis I is a curved line (referred to as another first curved line).

Moreover, in the present embodiment, the optical element 4 may be not tilted relatively to the optical imaging lens 10. In other word, in the present embodiment, the cross-sectional line Lyz-41 of the object-side surface 41 and the Y direction may be substantially parallel, but the invention is not limited thereto. In other embodiments, the optical element 4 may be tilted relatively to the optical imaging lens 10, and the cross-sectional line Lyz-41 of the object-side surface 41 and the Y direction may be not parallel.

The optical imaging lens 10 includes a first lens element 1, a second lens element 2 and a last lens element 3 arranged in sequence from an object side to an image side along an optical axis I. It is supplemented that the object side is a side facing the object to be shot, and the image side is a side facing the image surface 100. The last lens element 3 is a lens element in the optical imaging lens 10 nearest to the image side. The first lens element 1 to the last lens element 3 respectively have object-side surfaces 11, 21 and 31 facing the object side and pervious to the imaging rays and image-side surfaces 12, 22 and 32 facing the image side and pervious to the imaging rays.

In the present embodiment, the optical imaging lens 10 further includes an aperture stop 0. The aperture stop 0 may be located between the optical element 4 and the object-side surface 11 of the first lens element 1, but the invention is not limited thereto. An image is formed on an image surface 100 by imaging rays emitted by the object and passed through the aperture stop 0, the first lens element 1, the second lens element 2 and the last lens element 3. In the present embodiment, the image surface 100 may be an aspheric surface. However, the invention is not limited thereto, in other embodiments, the image surface 100 may be a plane.

The first lens element 1 has positive refracting power. The object-side surface 11 of the first lens element 1 is a convex surface, and has a convex portion 111 in a vicinity of the optical axis I and a convex portion 112 in a vicinity of a periphery. The image-side surface 12 of the first lens element 1 is a concave surface, and has a concave portion 121 in the vicinity of the optical axis I and a concave portion 122 in the vicinity of the periphery. In the present embodiment, the object-side surface 11 and the image-side surface 12 of the first lens element 1 both are spherical surfaces, and a material of the first lens element 1 is a glass material, but the invention is not limited thereto.

The second lens element 2 has negative refracting power. The object-side surface 21 of the second lens element 2 has a convex portion 211 in a vicinity of the optical axis I and a concave portion 212 in a vicinity of the periphery. The image-side surface 22 of the second lens element 2 has a concave portion 221 in a vicinity of the optical axis I and a concave portion 222 in a vicinity of the periphery. In the present embodiment, the object-side surface 21 and the image-side surface 22 of the second lens element 2 both are aspheric surfaces, and a material of the second lens element 2 is a plastic material, but the invention is not limited thereto.

Figure 7A:
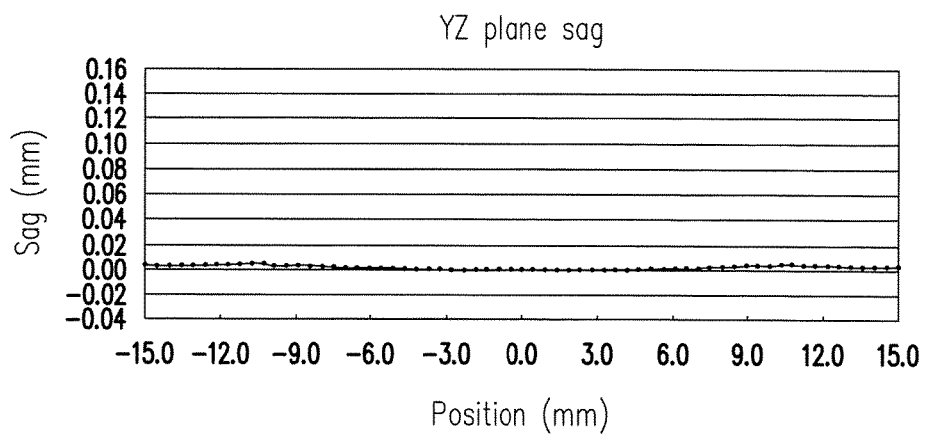
FIG. 7A is a schematic diagram illustrating a curve of sags, in a direction of the optical axis, of the object-side surface of the last lens element on a plane parallel to the YZ plane and containing the optical axis according to the first embodiment of the present invention.

The last lens element 3 has positive refracting power. One of the object-side surface 31 and the image-side surface 32 of the last lens element 3 is a second curved surface. In the present embodiment, the object-side surface 31 of the last lens element 3 is the second curved surface, but the invention is not limited thereto. A cross-sectional line Lxz-31 of the object-side surface 31 obtained by cutting the object-side surface 31 along a plane parallel to the XZ plane and containing the optical axis I is a curved line (referred to as a second curved line). In an embodiment, a curved direction of the first curved line (referred to as the cross-sectional line Lxz-41 or the cross-sectional line Lxz-42) is the same as a curved direction of the second curved line (referred to as the cross-sectional line Lxz-31). The cross-sectional line Lxz-31 of the object-side surface 31 of the last lens element 3 may protrude toward the object side. In an embodiment, the cross-sectional line Lxz-31 of the object-side surface 31 of the last lens element 3 is curved towards a single direction, and is, for example, a C-shaped curved line. A cross-sectional line Lyz-31 of the object-side surface 31 of the last lens element 3 obtained by cutting the object-side surface 31 of the last lens element 3 along a plane parallel to the YZ plane and containing the optical axis I is substantially a straight line. The cross-sectional line Lyz-31 is "substantially" the straight line means that sags of the cross-sectional line Lyz-31, in a direction of the optical axis I, of the object-side surface 31 of the last lens element 3 on a plane parallel to the YZ plane and containing the optical axis I fall within a range of −0.02 to 0.02 mm (e.g., as shown in FIG. 7A). The optical imaging lens 10 utilizes the second curved surface (for example: the object-side surface 31) of the last lens element 3 designed as mentioned above to be able to correct astigmatism caused by the first curved surface (for example: the object-side surface 41 and/or the image-side surface 42) of the optical element 4. Further, the radius of curvature of cross-sectional line Lxz-31 (referred to as the second curved line) is determined by a thickness of the optical element 4 along the optical axis I, so as to correct astigmatism caused by the optical element 4.

Figure 7B:
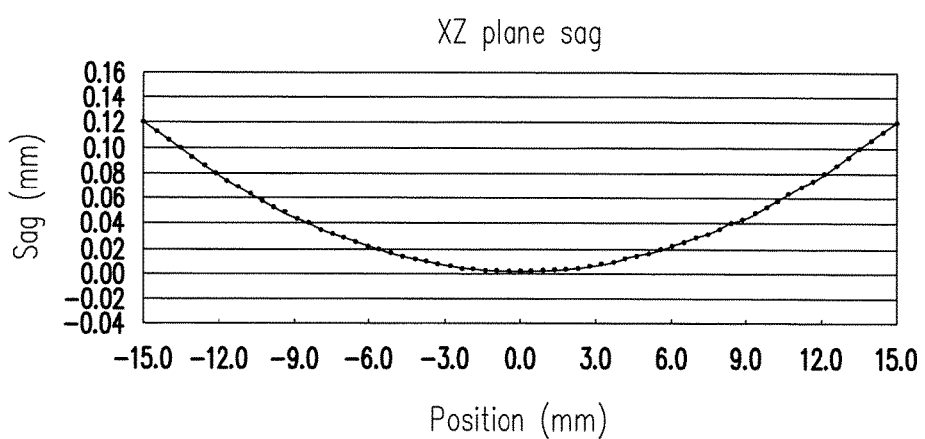
FIG. 7B is a schematic diagram illustrating a curve of sags, in a direction of the optical axis, of the object-side surface of the last lens element on a plane parallel to the XZ plane and containing the optical axis according to the first embodiment of the present invention.

FIG. 7A is a schematic diagram illustrating a curve of sags, in a direction of the optical axis I, of the object-side surface 31 of the last lens element 3 on a plane parallel to the YZ plane and containing the optical axis I according to the first embodiment of the present invention. FIG. 7B is a schematic diagram illustrating a curve of sags in a direction of the optical axis I, of the object-side surface 31 of the last lens element 3 on a plane parallel to the XZ plane and containing the optical axis I according to the first embodiment of the present invention. Referring to FIG. 6A, FIG. 6B, FIG. 7A and FIG. 7B, in the present embodiment, the object-side surface 31 is a toroidal surface. In other word, a radius of curvature of a cross-sectional line Lxz-31 of the object-side surface 31 obtained by cutting the object-side surface 31 along a plane parallel to the XZ plane and containing the optical axis I is different from a radius of curvature of a cross-sectional line Lyz-31 of the object-side surface 31 obtained by cutting the object-side surface 31 along a plane parallel to the YZ plane and containing the optical axis I. In addition, in the present embodiment, the image-side surface 32 is an aspheric surface, and a material of the last lens element 3 is a plastic material, but the invention is not limited thereto.

In the present embodiment, a material of one of the lens elements (for example: the second lens element 2) of the optical imaging lens 10 may be a plastic material, and a material of another of the lens elements (for example: the first lens element 1) of the optical imaging lens 10 may be a glass material. A variation of refractive index of the one made of the plastic material due to a temperature variation can be compensated by a variation of refractive index of the another made of the glass material due to a temperature variation. Thereby, a variation of refractive index of the whole optical imaging lens 10 due to a temperature variation can be reduced, and an optical performance of the optical imaging lens 10 can be stabilized within a certain temperature range. In addition, the one of the lens elements made of the plastic material can reduce a cost and a weight of the optical imaging lens 10.

The optical imaging lens 10 of the present first embodiment only includes three lens elements (referred to as the first lens element 1, the second lens element 2 and the last lens element 3). However, the invention is not limited thereto, in other embodiment, the second lens element 2 may include two or more lens elements, and an optical imaging lens 10 of the other embodiment may include four or more lens elements. In one embodiment, the two or more lens elements may connected to each other by an adhesive. However, the invention is not limited thereto. In other embodiment, the two or more lens elements may be separate from each other. Specially, a problem of a manufacturing tolerance and an effect of correcting astigmatism of the optical imaging lens 10 can be improved by the second lens element 2 including the two or more lens elements.

Other detailed optical data of the first embodiment is shown in FIG. 8. In a column representing radius of the curvature of FIG. 8, the numbers behind "XZ:" mean radiuses of the curvatures of cross-sectional lines of the surfaces obtained by cutting the surface along a plane parallel to the XZ plane and containing the optical axis I, the numbers behind "YZ:" mean radiuses of the curvatures of cross-sectional lines of the surfaces obtained by cutting the surface along a plane parallel to the YZ plane and containing the optical axis I, and the numbers where there is no word ahead mean radiuses of the curvatures of cross-sectional lines of the surfaces obtained by cutting the surface along any plane containing the optical axis I. Moreover, in the first embodiment, an effective focal length EFL (effective focal length) of the optical imaging lens 10 is 69.444 mm, a half field of view HFOV (half field of view) is 20.000°, and a f-number $F_{NO}$ is 2.84.

In addition, in the present embodiment, the object-side surface 21, the image-side surfaces 22, 32 and the image surface 100 are aspheric surfaces. Moreover, these aspheric surfaces are defined according to the following formula (1):

$$Z(Y) = \frac{Y^2}{R} \bigg/ \left(1 + \sqrt{1 - (1+K)\frac{Y^2}{R^2}}\right) + \sum_{i=1}^{n} a_{2i} \times Y^{2i} \quad (1)$$

Wherein
Y: a distance between a point on an aspheric curve and the optical axis I;
Z: a depth (i.e. a sag) of the aspheric surface (a perpendicular distance between the point on the aspheric surface that is spaced by the distance Y from the optical axis I and a tangent plane tangent to a vertex of the aspheric surface on the optical axis I);
R: a radius of curvature of the surface of the lens element near the optical axis I;
K: a conic constant;
$a_{2i}$: $2i^{th}$ aspheric coefficient.

Aspheric constants in formula (1) of the object-side surface 21, the image-side surfaces 22, 32 and the image surface 100 are shown in FIG. 9. Number 21 in FIG. 9 indicates that the number 21 is an aspheric constant of the object-side surface 21 of the second lens element 2, and other numbers may be deduced by analogy.

In the present embodiment, the object-side surface 31 is a toroidal surface. The toroidal surface is formed by defining a curve or a straight line in the YZ plane, and rotating this curve about an axis parallel to the Y axis parallel to the Y direction and intersecting the Z axis parallel to the Z direction. Toroids are defined using a base radius of curvature in the YZ plane, as well as a conic constant and polynomial aspheric coefficients. The curve in the YZ plane is defined according to the following formula (2):

$$Z(Y) = cY^2/(1+\sqrt{1-(1+K)c^2Y^2}) + a_1Y^2 + a_2Y^4 + a_3Y^6 + a_4Y^8 + a_5Y^{10} + a_6Y^{12} + a_7Y^{14} \quad (2)$$

This curve is similar to the even aspheric surface sag formula (as the formula (1)), except the sixteenth order term has been omitted, and Y is a distance from a point on the curve or the straight line to the optical axis I in the Y direction, and c is an inverse of a radius of curvature of the surface of the lens element near the optical axis I. This curve or straight line is then rotated about an axis a distance R from the vertex. This distance R is referred to as the radius of rotation, and may be positive or negative. Aspheric constants in formula (2) of the object-side surface 31 are shown in FIG. 9.

In the present embodiment, the object-side surface 41 and the image surface 42 are a biconic surfaces. The biconic surface is similar to a toroidal surface, except the conic constant and base radius may be different in the X and Y directions. The biconic surface allows specification of Rx, Ry, Kx and Ky directly. The sag of a biconic is given by:

$$Z = c_x X^2 + c_y Y^2/(1+\sqrt{1-(1+K_x)c_x^2 X^2-(1+K_y)c_y^2 Y^2}),$$

wherein $$c_x = \frac{1}{R_x}, \quad c_y = \frac{1}{R_y},$$

X is a distance from a point on the biconic surface to the optical axis I in the X direction,
Y is a distance from a point on the biconic surface to the optical axis I in the Y direction,
$K_x$ is a conic constant of the biconic surface in the X direction, $K_y$ is a conic constant of the biconic surface in the Y direction, the radius of curvature of the biconic surface in the X direction is set in $R_x$, and the radius of curvature of the biconic surface in the Y direction is set in $R_y$.

In addition, key parameters and relationships between the key parameters of the optical aging lens 10 of the first embodiment are shown in FIG. 16.

Wherein,
T1 is a center thickness of the first lens element 1 on the optical axis I;
T2 is a center thickness of the second lens element 2 on the optical axis I;
T3 is a center thickness of the last lens element 3 on the optical axis I;
G12 is an air gap between the first lens element 1 and the second lens element 2 on the optical axis I;
G23 is an air gap between the second lens element 2 and the last lens element 3 on the optical axis I;
AAG is a sum of air gaps of the first lens element 1 to the last lens element 3 on the optical axis I;
ALT is a sum of center thicknesses of lenses from the first lens element 1 to the last lens element 3 on the optical axis I;
EFL is an effective focal length of the optical imaging lens 10;
BFL is a distance on the optical axis I from the image-side surface 32 of the last lens element 3 to the image surface 100;
TTL is a distance on the optical axis I from the object-side surface 11 of the first lens element 1 to the image surface 100.

Figure 10A:
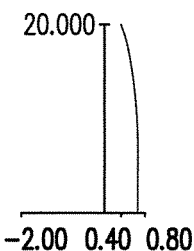
FIG. 10A to FIG. 10D are various aberrations and a longitudinal spherical aberration of an optical imaging lens according to a first embodiment.
Figure 10B:
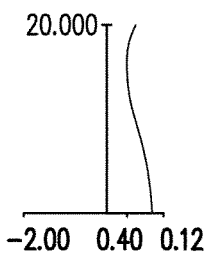
Figure 10C:
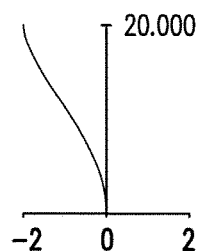
Figure 10D:
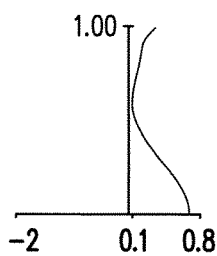

FIG. 10A and FIG. 10B respectively illustrate a field curvature aberration in a sagittal direction and a field curvature aberration in a tangential direction on the image surface 100 of the first embodiment. FIG. 10C illustrates a distortion aberration on the image surface 100 of the first embodiment. FIG. 10D illustrates a longitudinal spherical aberration in a case in which a pupil radius is 12.2200 mm of the optical imaging lens 10 according to the first embodiment.

Referring to FIG. 10A, in a diagram of a field curvature aberration in the sagittal direction of FIG. 10A, focus variations of a representative wavelength 905 nm within a range of an entire field of view fall within a range of 0.40 to 0.80 mm. Referring to FIG. 10B, in a diagram of the field curvature aberration in the tangential direction of FIG. 10B, focus variations of the representative wavelength 905 nm within a range of an entire field of view fall within a range of 0.40 to 0.12 mm. It shows that an optical system of the first embodiment of the present invention can eliminate aberrations. Referring to FIG. 10C, a distortion aberration diagram of FIG. 10C shows that a distortion aberration of the present first embodiment is maintained within a range of −2 to 0%, indicating that the distortion aberration of the present first embodiment satisfies the requirements for the image quality of the optical system. Referring to FIG. 10D, in a diagram of longitudinal spherical aberrations in FIG. 10D according to the present first embodiment, curves of the representative wavelength 905 nm approaches the middle, indicating that off-axis rays of different heights are converged nearby an imaging point. It can be seen from a deflection amplitude of a curve of the representative wavelength 905 nm that a deviation of imaging points of the off-axis rays at different heights is controlled within a range of 0.1 to 0.8 min. Therefore, the present embodiment obviously improves the aberration.

Figure 11A:
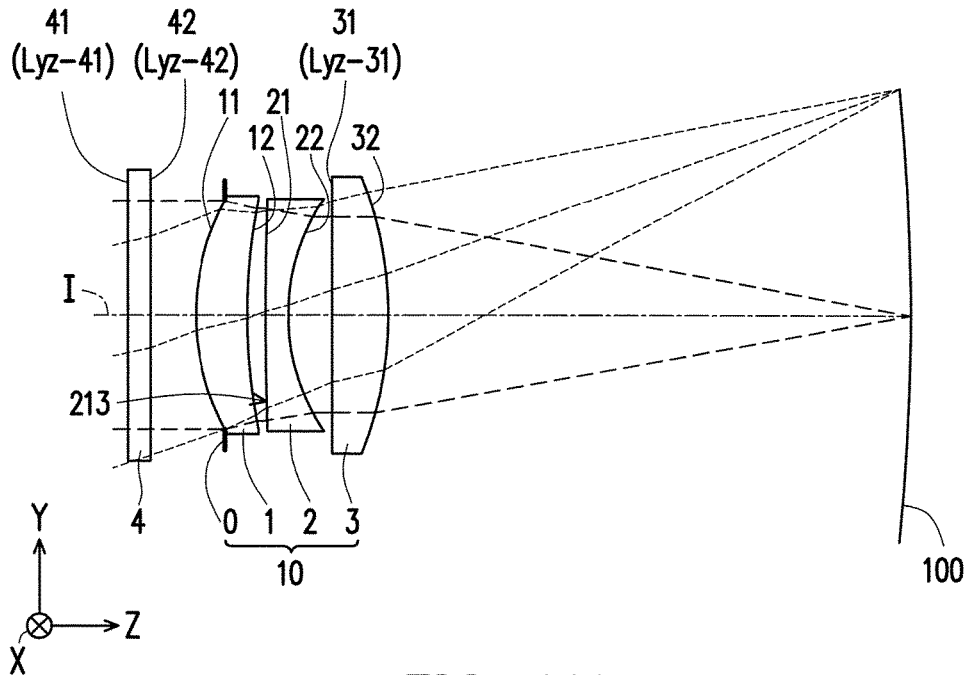
FIG. 11A is a schematic diagram illustrating cross sections of an optical element, an optical imaging lens and an image surface obtained by cutting the optical element, the optical imaging lens and the image surface along a plane parallel to an YZ plane and containing the optical axis I according to a second embodiment of the present invention.
Figure 11B:
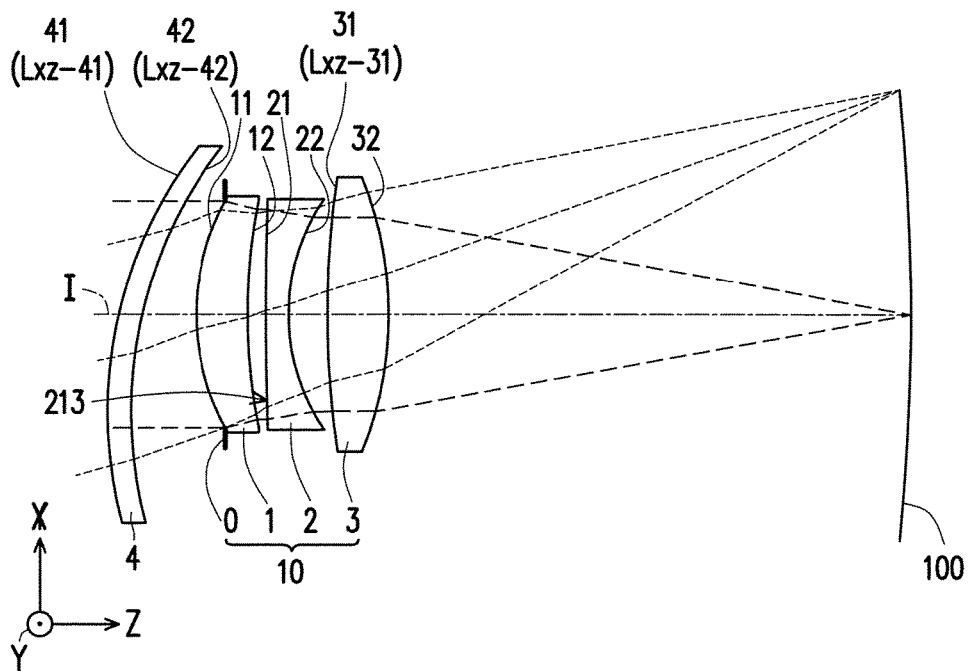
FIG. 11B is a schematic diagram illustrating cross sections of an optical element, an optical imaging lens and an image surface obtained by cutting the optical element, the optical imaging lens and the image surface along a plane parallel to an XZ plane and containing the optical axis according to a second embodiment of the present invention.
Figure 12A:
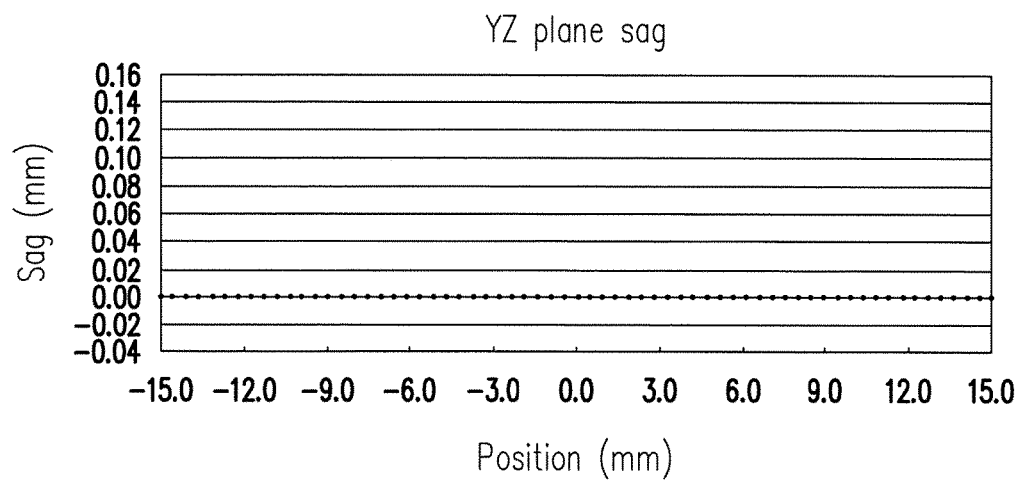
FIG. 12A is a schematic diagram illustrating a curve of sags, in a direction of the optical axis, of the object-side surface of the last lens element on a plane parallel to the YZ plane and containing the optical axis according to the second embodiment of the present invention.
Figure 12B:
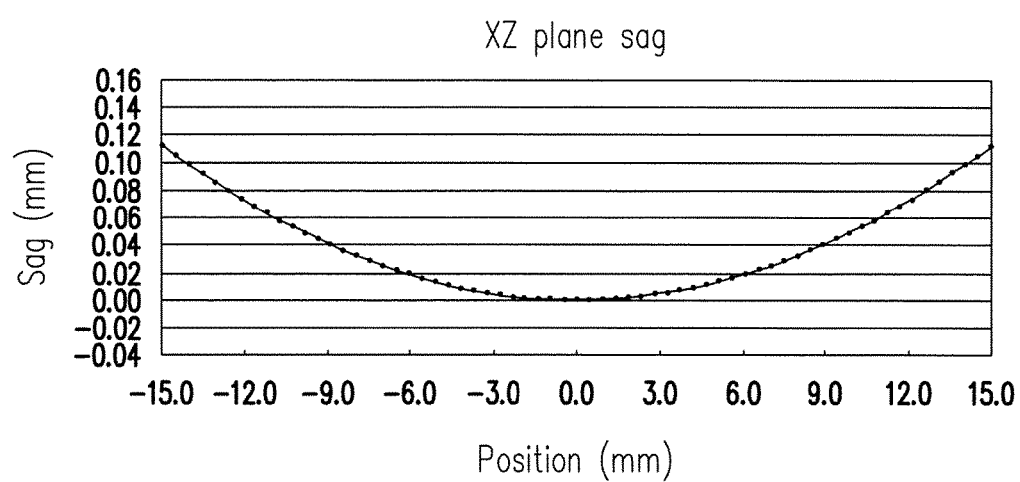
FIG. 12B is a schematic diagram illustrating a curve of sags, in a direction of the optical axis, of the object-side surface of the last lens element on a plane parallel to the XZ plane and containing the optical axis according to the second embodiment of the present invention.

FIG. 11A is a schematic diagram illustrating cross sections of an optical element 4, an optical imaging lens 10 and an image surface 100 obtained by cutting the optical element 4, the optical imaging lens 10 and the image surface 100 along a plane parallel to an YZ plane and containing the optical axis I according to a second embodiment of the present invention. FIG. 11B is a schematic diagram illustrating cross sections of an optical element 4, an optical imaging lens 10 and an image surface 100 obtained by cutting the optical element 4, the optical imaging lens 10 and the image surface 100 along a plane parallel to an XZ plane and containing the optical axis I according to a second embodiment of the present invention. FIG. 12A is a schematic diagram illustrating a curve of sags in a direction of the optical axis I, of the object-side surface 31 of the last lens element 3 on a plane parallel to the YZ plane and containing the optical axis I according to the second embodiment of the present invention. FIG. 12B is a schematic diagram illustrating a curve of sags in a direction of the optical axis I, of the object-side surface 31 of the last lens element 3 on a plane parallel to the XZ plane and containing the optical axis I according to the second embodiment of the present invention. Referring to FIG. 11A, FIG. 11B, FIG. 12A and FIG. 12B, the optical imaging lens 10 of the second embodiment of the present invention is substantially similar to the first embodiment, and is merely different in the optical data, the aspheric constants, and parameters between the first lens element 1, the second lens element 2 and the last lens element 3; and is different in that the object-side surface 21 of the second lens element 2 has a convex portion 213 in a vicinity of a periphery and a cross-sectional line Lyz-31 of the object-side surface 31 of the last lens element 3 obtained by cutting the object-side surface 31 along a plane parallel to the YZ plane is a straight line. Herein, it should be noted that in order to clearly show the diagram, FIG. 11 omits some of numbers of concave portions and convex portions same to those in the first embodiment.

Detailed optical data of the optical imaging lens 10 according to the second embodiment is shown in FIG. 13. Moreover, in the second embodiment, an EFL is 69.427 mm, an HFOV is 20.000°, and an $F_{NO}$ is 2.84.

FIG. 14 shows aspheric constants in formula (1) of the object-side surface 21, the image-side surfaces 22 and 32 and the image surface 100 according to the second embodiment and aspheric constants in formula (2) of the object-side surface 31 according to the second embodiment.

In addition, key parameters and relationships between the key parameters of the optical imaging lens 10 of the second embodiment are shown in FIG. 16.

Figures 15A, 15B, 15C, 15D:
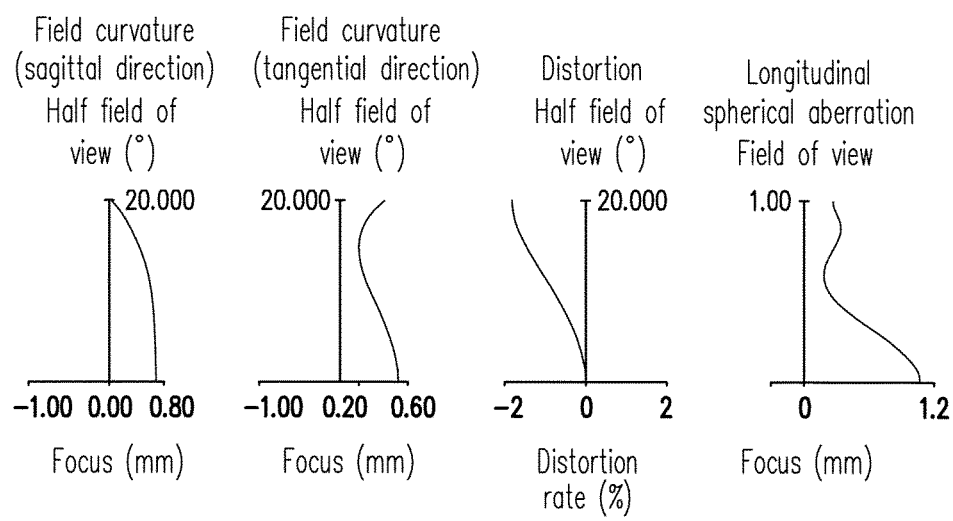
FIG. 15A to FIG. 15D are various aberrations and a longitudinal spherical aberration of an optical imaging lens according to a second embodiment.

Referring to FIG. 15A, in a diagram of a field curvature aberration in a sagittal direction of FIG. 15A, focus variations of a representative wavelengths 905 nm within a range of an entire field of view fall within a range of 0.00 to 0.80 mm. Referring to FIG. 15B, in a diagram of a field curvature aberration in a tangential direction of FIG. 15B, focus variations of the representative wavelength 905 nm within the range of the entire field of view fall within a range of 0.20 to 0.60 mm. Referring to FIG. 15C, a diagram of distortion aberrations in FIG. 15C shows that the distortion aberrations according to the present second embodiment are maintained within a range of −2 to 0%. Referring to FIG. 15D, in a diagram of longitudinal spherical aberrations in FIG. 15D according to the present second embodiment, deviations of imaging points of off-axis rays of different heights are controlled within a range of 0 to 1.2 mm. On this basis, as compared with an existing optical lens, the present second embodiment can still correct astigmatism caused by the optical element 4.

I. When the optical imaging lens 10 of the embodiments of the present invention satisfies any one of the following conditional expressions, an effect of shortening the TTL is achieved by reducing an air gap between lens elements or shortening thickness of a lens element, and meanwhile considering the difficulty for manufacturing: TTL/BFL≤1.6; ALT/AAG≤2.5; T3/T1≤1.5; BFL/T3≤9.5; BFL/T1≤11.0; T1/T2≥1.5.

II. When the optical imaging lens of the present invention satisfies any one of the following conditional expressions, it indicates that the optical imaging lens has a better configuration and can generate a good image quality on the premise of ensuring appropriate yield: 1.0≤TTL/BFL≤1.6; 2.0≤ALT/AAG≤2.5; 0.9≤T3/T1≤1.5; 8.5≤BFL/T3≤9.5; 9.0≤BFL/T1≤11.0; 3.5≥T1/T2≥1.5.

In addition, the optical imaging lens has a telephoto effect by a design of the number of EFL/TTL. For example, EFL/TTL≥0.8. Moreover, it is favorable for 1.5≥EFL/TTL≥0.8.

Based on the above, the optical imaging lens of at least one of the embodiments of the present invention may have at least one of the following effects and advantages:

(1) A material of one of the lens elements of the optical imaging lens may be a plastic material, and a material of another of the lens elements of the optical imaging lens may be a glass material. A variation of refractive index of the one of the lens elements made of the plastic material due to a temperature variation can be compensated by a variation of refractive index of the another of the lens elements made of the glass material due to a temperature variation. Thereby, a variation of refractive index of the whole optical imaging lens due to a temperature variation can be reduced, and an optical performance of the optical imaging lens can be stabilized within a certain temperature range.

(2) Moreover, the one of the lens elements of the optical imaging lens made of the plastic material can reduces a cost and a weight of the whole optical imaging lens.

(3) A cross-sectional line of the object-side surface obtained by cutting the second curved surface of the last lens element along a plane parallel to the XZ plane and containing the optical axis is a curved line. A cross-sectional line of the second curved surface of the last lens element obtained by cutting the second curved surface of the last lens element along a plane parallel to the YZ plane and containing the optical axis is substantially a straight line. A curved direction of the first curved surface of the optical element is the same as a curved direction of the second curved surface of the last lens element. The optical imaging lens utilizes the curved surface of the last lens element designed as mentioned above to be able to correct astigmatism caused by the curved surface of the optical element.

(4) A telephoto effect of the optical imaging lens can be improved by the collocation of the first lens element having positive refracting power and the second lens element having negative refracting power.

(5) The object-side surface of the first lens element is designed to have a convex portion in a vicinity of an optical axis, and the convex portion benefits a convergence of the imaging rays.

(6) The image-side surface of the second lens element is designed to have a concave portion in a vicinity of an optical axis, and the concave portion benefits a correction of optical paths of the imaging rays and an improvement of an image quality.

(7) The collocation of the aperture stop located on the object-side surface of the first lens element and the first lens element having positive refracting power benefits a convergence of the imaging rays entering the optical imaging lens.

Although the present invention discloses the foregoing by using the embodiment, the foregoing is not intended to limit the present invention. Any person of ordinary skill in the art may make some variations and modifications without departing from the scope and spirit of the invention. Therefore, the protection scope of the present invention should fall within the scope defined by the appended claims below.

What is claimed is:

1. An optical imaging lens configured to allow imaging rays to pass through a first curved surface of an optical element and the optical imaging lens in sequence to form an image on an image surface, the optical imaging lens comprising:
    a first lens element, a second lens element, and a last lens element arranged in sequence from an object side to an image side along an optical axis, wherein the last lens element is a lens element in the optical imaging lens nearest to the image side, and each of the first lens element to the last lens element has an object-side surface facing the object side and pervious to the imaging rays and an image-side surface facing the image side and pervious to the imaging rays;
    wherein a Z direction is parallel to the optical axis, a Y direction is perpendicular to the Z direction, an X direction is perpendicular to the Y direction and the Z direction, an XZ plane is defined by the X direction and the Z direction, an YZ plane is defined by the Y direction and the Z direction, a cross-sectional line of the first curved surface of the optical element obtained by cutting the first curved surface of the optical element along a plane parallel to the XZ plane and containing the optical axis is a first curved line, one of the object-side surface and the image-side surface of the last lens element is a second curved surface, a cross-sectional line of the second curved surface of the last lens element obtained by cutting the second curved surface of the last lens element along a plane parallel to the XZ plane and containing the optical axis is a second curved line, a cross-sectional line of the second curved surface of the last lens element obtained by cutting the second curved surface of the last lens element along a plane parallel to the YZ plane and containing the optical axis is substantially a straight line, and a material of at least one of the first lens element to the last lens element is a plastic material,
    wherein the optical imaging lens satisfies:
    EFL/TTL≥0.8, wherein EFL is an effective focal length of the optical imaging lens, and TTL is a distance on the optical axis from the object-side surface of the first lens element to the image surface.

2. The optical imaging lens according to claim 1, wherein the first lens element has positive refracting power.

3. The optical imaging lens according to claim 1, wherein the object-side surface of the last lens element is the second curved surface of the last lens element.

4. The optical imaging lens according to claim 3, wherein the cross-sectional line of the object-side surface of the last lens element obtained by cutting the object-side surface of the last lens element along the plane parallel to the YZ plane is a straight line.

5. The optical imaging lens according to claim 1, wherein the second lens element has negative refracting power.

6. The optical imaging lens according to claim 1, wherein the last lens element has positive refracting power.

7. The optical imaging lens according to claim 1, wherein a material of at least one of the first lens element to the last lens element is glass.

8. The optical imaging lens according to claim 1, wherein a radius of curvature of the second curved line is determined by a thickness of the optical element along the optical axis, so as to correct astigmatism caused by the optical element.

9. The optical imaging lens according to claim 1, wherein the optical imaging lens satisfies:
    TTL/BFL≤1.6, wherein BFL is a distance on the optical axis from the image-side surface of the last lens element to the image surface.

10. The optical imaging lens according to claim 1, wherein the optical imaging lens satisfies:
    ALT/AAG≤2.5, wherein ALT is a sum of center thicknesses of lenses from the first lens element to the last lens element on the optical axis, and AAG is a sum of air gaps of the first lens element to the last lens element on the optical axis.

11. The optical imaging lens according to claim 1, wherein the optical imaging lens satisfies:
    T3/T1≤1.5, wherein T1 is a center thickness of the first lens element on the optical axis, and T3 is a center thickness of the last lens element on the optical axis.

12. The optical imaging lens according to claim 1, wherein the optical imaging lens satisfies:
    BFL/T3≤9.5, wherein BFL is a distance on the optical axis from the image-side surface of the last lens element to the image surface, and T3 is a center thickness of the last lens element on the optical axis.

13. The optical imaging lens according to claim 1, wherein the optical imaging lens satisfies:
    BFL/T1≤11.0, wherein BFL is a distance on the optical axis from the image-side surface of the last lens element to the image surface, and T1 is a center thickness of the first lens element on the optical axis.

14. The optical imaging lens according to claim 1, wherein the optical imaging lens further includes an aperture stop located between the optical element and the object-side surface of the first lens element.

15. The optical imaging lens according to claim 1, wherein the object-side surface of the first lens element has a convex portion in a vicinity of the optical axis.

16. The optical imaging lens according to claim 1, wherein the image-side surface of the second lens element has a concave portion in a vicinity of the optical axis.

17. The optical imaging lens according to claim 1, wherein the optical imaging lens satisfies:

T1/T2≥1.5, wherein T1 is a center thickness of the first lens element on the optical axis, and T2 is a center thickness of the second lens element on the optical axis.

18. The optical imaging lens according to claim 1, wherein a curved direction of the first curved line is the same as a curved direction of the second curved line.

\* \* \* \* \*